(12) United States Patent
Stevens et al.

(10) Patent No.: US 7,905,664 B1
(45) Date of Patent: Mar. 15, 2011

(54) INPUT/OUTPUT CONNECTOR HAVING AN ACTIVE ELECTRICAL/OPTICAL COMMUNICATION COMPONENT

(75) Inventors: Rick C. Stevens, Apple Valley, MN (US); Aaron M. Cordes, Bloomington, MN (US); Ryan L. Nelson, Farmington, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 196 days.

(21) Appl. No.: 12/237,721

(22) Filed: Sep. 25, 2008

(51) Int. Cl.
*G02B 6/36* (2006.01)
*G02B 6/38* (2006.01)
*G02B 6/40* (2006.01)

(52) U.S. Cl. ................ 385/89; 385/78; 385/88; 385/90; 385/92

(58) Field of Classification Search .................... 385/89, 385/90
See application file for complete search history.

(56) References Cited

U.S. PATENT DOCUMENTS

| | | | |
|---|---|---|---|
| 5,138,679 A * | 8/1992 | Edwards et al. | 385/90 |
| 5,574,814 A * | 11/1996 | Noddings et al. | 385/90 |
| 5,937,125 A * | 8/1999 | Creswick et al. | 385/88 |
| 6,056,448 A * | 5/2000 | Sauter et al. | 385/92 |
| 6,085,003 A | 7/2000 | Knight | |
| 6,238,100 B1 * | 5/2001 | Sasaki et al. | 385/59 |
| 6,250,820 B1 * | 6/2001 | Melchior et al. | 385/89 |
| 6,322,257 B1 | 11/2001 | Kryzak | |
| 6,386,768 B1 * | 5/2002 | Yoon et al. | 385/88 |
| 6,485,192 B1 * | 11/2002 | Plotts et al. | 385/75 |
| 6,685,363 B2 | 2/2004 | Kryzak | |
| 6,712,527 B1 * | 3/2004 | Chan et al. | 385/88 |
| 6,739,760 B2 * | 5/2004 | Cheng et al. | 385/89 |
| 6,821,027 B2 * | 11/2004 | Lee et al. | 385/89 |
| 6,860,648 B2 * | 3/2005 | Jin et al. | 385/89 |
| 6,934,450 B2 * | 8/2005 | Hiramatsu | 385/52 |
| 6,939,057 B2 * | 9/2005 | Beier et al. | 385/89 |
| 7,329,054 B1 * | 2/2008 | Epitaux et al. | 385/89 |
| 7,494,287 B2 * | 2/2009 | Wang et al. | 385/92 |
| 7,729,581 B2 * | 6/2010 | Rolston et al. | 385/52 |
| 2003/0180006 A1 * | 9/2003 | Loh et al. | 385/88 |
| 2006/0104576 A1 * | 5/2006 | Nagasaka | 385/93 |

OTHER PUBLICATIONS

Protokraft *Lightning* Mil-Dtl-38999 Fiber Optic Transceivers. Obtained Jul. 1, 2008 from http://www.protokraft.com/joomla/index.php?option=com_content&task=view&id=40&.

* cited by examiner

*Primary Examiner* — Michelle R Connelly Cushwa
(74) *Attorney, Agent, or Firm* — Hamre, Schumann, Mueller & Larson, P.C.

(57) ABSTRACT

An I/O connector that includes an optical communication component, for example an optical transceiver, mounted to a ferrule body of the I/O connector. The connector can be installed on a circuit card assembly and is configured to allow blind-mate connectivity. Mounting the optical communication component to the ferrule body of the connector frees up the surface of the circuit card that could be eliminated or used for mounting other components, facilitates installation of and access to the optical communication component for repair and maintenance thereof, and eliminates the need for a fiber optic pigtail extending from the connector to the circuit card.

18 Claims, 5 Drawing Sheets

INPUT/OUTPUT CONNECTOR HAVING AN ACTIVE ELECTRICAL/OPTICAL COMMUNICATION COMPONENT

FIELD

This disclosure relates to an input/output ("I/O") connector, particularly a connector that includes an active electrical/optical communication component, such as an optical transmitter, receiver, or transceiver, that can be installed on a circuit card assembly, and that allows blind-mate connectivity.

BACKGROUND

An example of an active electrical/optical communication component is an optical transceiver that is used for communication by receiving and transmitting optical signals through optical waveguides such as optical fibers. With reference to FIG. 1, an exemplary use of an optical transceiver 30 is illustrated mounted on a circuit card assembly 32. The circuit card assembly includes a circuit card 34 on which various electrical components are mounted. The optical transceiver 30 is electrically connected to the circuit card 34, and optically coupled to an I/O connector 36 via a fiber optic pigtail 38. The fiber optic pigtail 38 extends from the connector 36 to the optical transceiver 30 to pass optical signals to and from the transceiver. The connector 36 includes a ferrule that can be designed to allow blind-mate connection to another circuit card assembly, such as a backplane, by implementing float for alignment.

In the assembly in FIG. 1, placing the transceiver on the circuit card 34 occupies space on the circuit card 34 that could be eliminated or used to mount other components. In addition, special care, including manual mounting of the transceiver, must be taken to mount the transceiver to avoid damaging the fiber optic pigtail 38. Further, the fiber optic pigtail 38 is exposed and prone to damage during regular handling and maintenance of the circuit card assembly.

SUMMARY

An I/O connector is described that includes at least one active electrical/optical communication component, such as an optical transmitter, receiver, transceiver or similar component having transmit and/or receive functionality, integrated with the connector. By integrating the communication component with the connector rather than mounting it on the circuit card itself, the usable surface area of the circuit card is maximized. In addition, assembly of the circuit card and maintenance of the communication component are simplified, since the communication component is easily assembled to and removed from the circuit card assembly. The communication component can be replaced by removing it from the connector housing or replacing the connector with a new connector. Moreover, the need for a fiber optic pigtail is eliminated.

In one embodiment, an I/O connector is provided that includes a connector housing and an insert that is mounted to and removable as a unit from the connector housing. The insert includes a ferrule body having at least one optical fiber embedded therein. The at least one optical fiber has an exposed end for connecting with an exposed end of a mating connector. In addition, the insert includes an optical communication component that is coupled to the opposing end of the at least one optical fiber so that optical signals can be passed between the optical communication component and the exposed mating end of the optical fiber.

The optical communication component may be mounted anywhere on or in the connector body, for example mounted on the ferrule body. The connector housing can also have at least one electrical I/O interface to allow electrical I/O communications. In addition, the ferrule can be mounted to the connector housing to allow the ferrule to float to provide blind-mate capability.

The I/O connector may be a component of a circuit card assembly. In addition to the I/O connector, the circuit card assembly includes a circuit card and electrical components mounted on the circuit card. The circuit card is electrically connected to the optical communication component, for example by a flexible ribbon cable.

With the described connector, the need for optical fibers or pigtails extending over the surface of the circuit card is eliminated. Accordingly, the optical communication component and the optical fibers do not consume space on or over the surface of the circuit card. In addition, the optical communication component can be easily connected to and disconnected from the circuit card assembly for replacement of the optical communication component or the I/O connector. Moreover, dust and dirt do not accumulate on optical connecting portions leading to the optical communication component because optical interfaces are reduced and all optical interfaces can be contained within I/O connector. Thus, contamination of the optical connecting portions is kept minimal.

DETAILED DESCRIPTION

Figure 1:
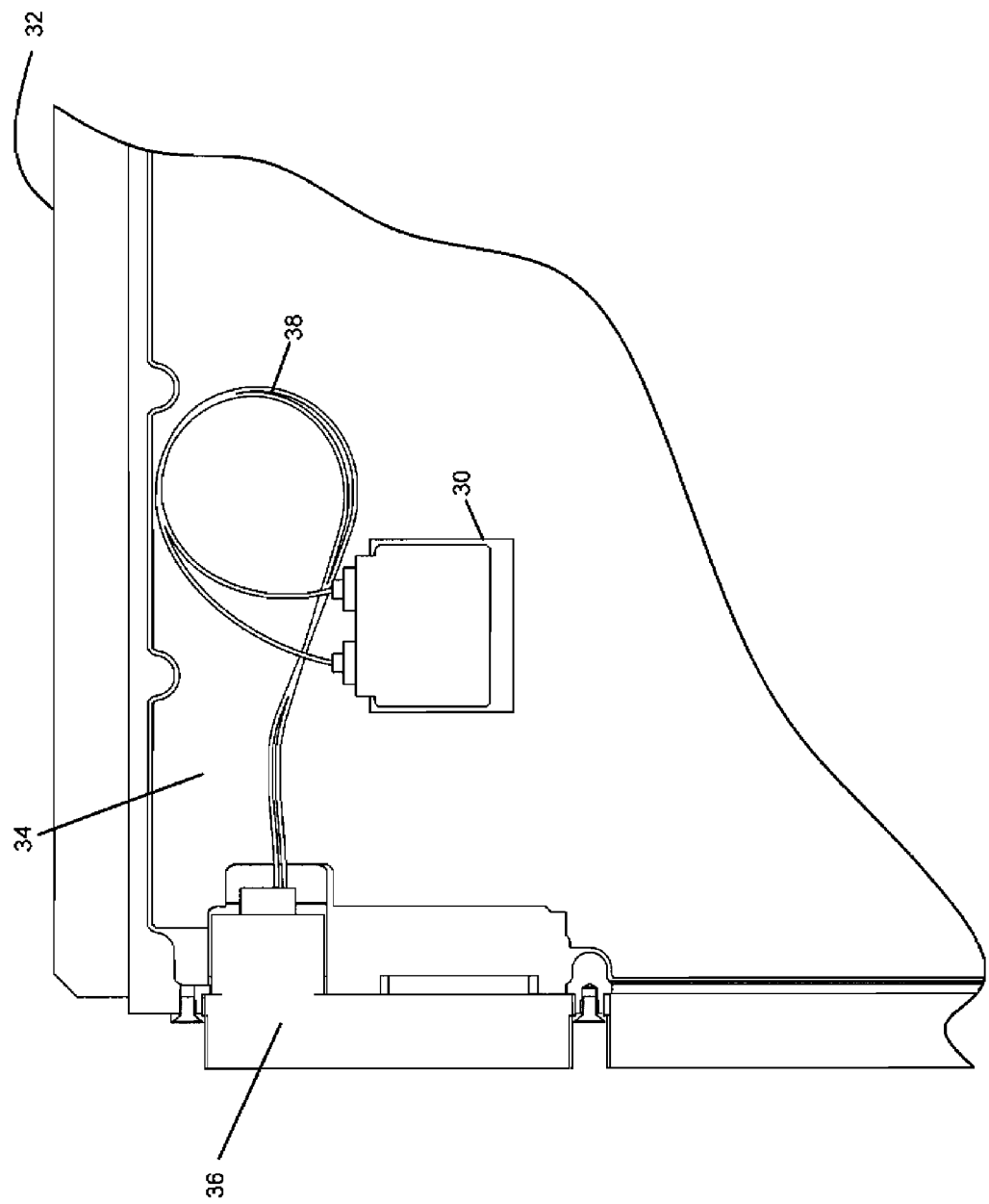
FIG. 1 illustrates the arrangement of an optical transceiver on a circuit card assembly of the prior art.
Figure 2:
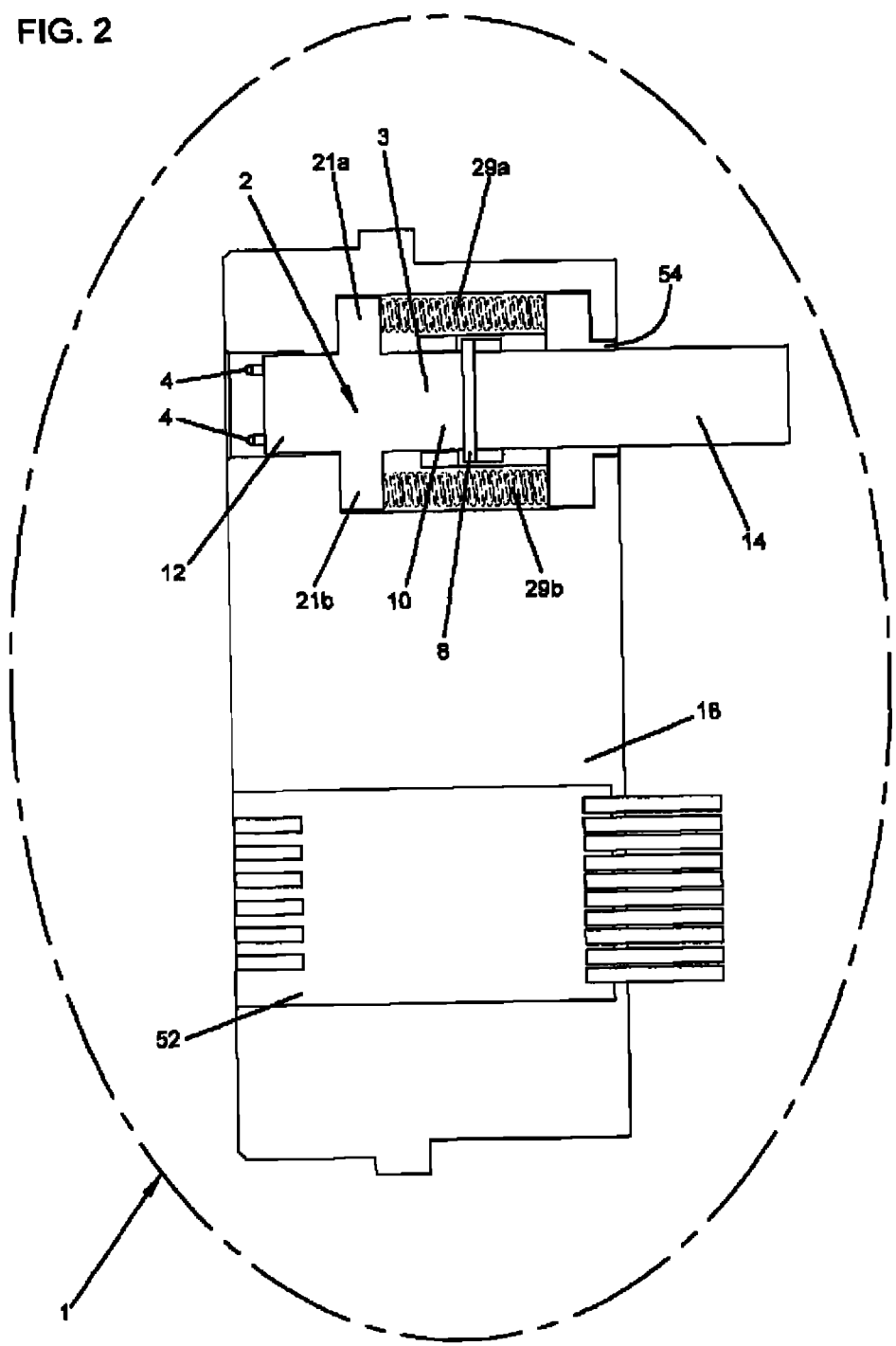
FIG. 2 is a detailed view of the area within circle 2 of FIG. 3 and illustrates an I/O connector having an integrated optical communication component.

FIG. 2 illustrates an I/O connector 1 having a ferrule 2 and a connector housing 18 to which the ferrule 2 is mounted. The ferrule 2 includes a ferrule body 3, alignment pins 4 that align the ferrule body 3 with a mating connector (not shown), and optical fibers (not shown) embedded within the ferrule body 3 having exposed ends 6 (visible in FIG. 4) between the alignment pins 4 for mating with corresponding optical fiber ends on the mating connector for optical connectivity with the mating connector. This general construction of the ferrule body 3 and alignment pins 4 is well known. Alignment mechanisms other than alignment pins, such as a sleeve or other mechanisms, can be used to align the connector with the mating connector.

An optical communication component 8 is integrated into the I/O connector 1. To facilitate this description, the communication component 8 will be described herein as being an optical transceiver having both transmit and receive functionality. However, it is to be realized that the communication component 8 can be an optical receiver with receive functionality, an optical transmitter with transmit functionality, and similar optical communication devices having transmit and/or receive functionality.

The transceiver can be mounted anywhere on or in the connector housing 18 while being coupled to the optical fibers. In the illustrated embodiment, the transceiver 8 is mounted to the ferrule body 3 so that it is insertable and removable as an integral unit with the ferrule body 3. The transceiver 8 may be mounted anywhere on or in the ferrule body 3. In the illustrated embodiment, the transceiver 8 is mounted to an end 10 of the ferrule body 3 on an outside surface of the ferrule body, opposite the end 12 containing the alignment pins 4.

The transceiver 8 is coupled to the embedded optical fibers of the ferrule body 3 which pass optical signals to and from the transceiver. The optical fibers run inside the ferrule body 3 from the exposed ends 6 at the ferrule body end 12 to the transceiver 8. Thus, optical signals can be input to the transceiver 8 via the ends 6 and the optical fibers within the ferrule body, and optical signals can be sent from the transceiver 8 to the ends 6 via the optical fibers.

Figure 3:
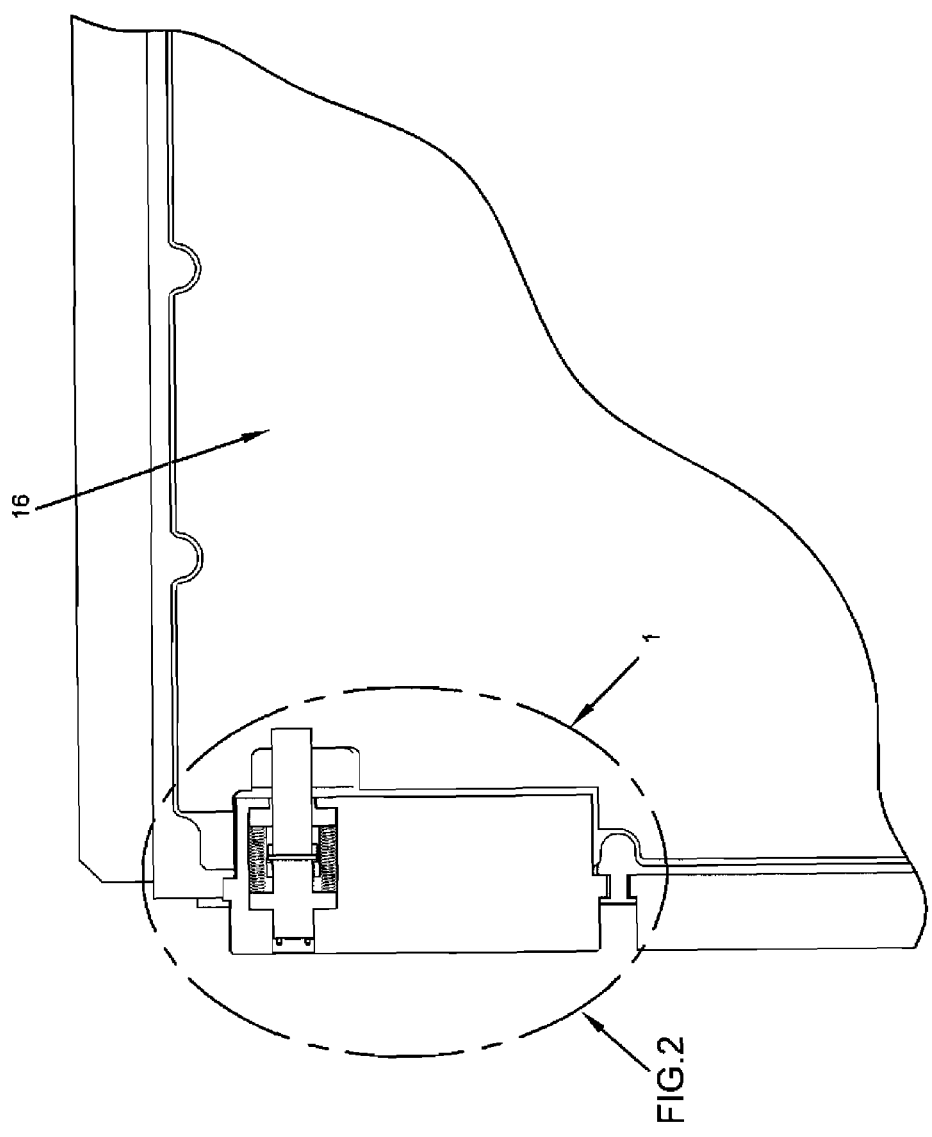
FIG. 3 illustrates a circuit card assembly using the I/O connector of FIG. 2.

An electrical connecting device 14 is coupled to the transceiver 8 and is used to electrically connect the transceiver 8 to a circuit card 16, shown in FIG. 3, with which the connector 1 is used. The electrical connecting device 14 may be any connecting device(s) suitable for conducting electrical signals from and to the transceiver. For example, the device 14 can be a flexible ribbon cable. The ferrule 2, transceiver 8, and the electrical connecting device 14 comprise an active electro-optical insert 50 that is insertable and removable as a unit from the connector housing 18.

As shown diagrammatically in FIG. 2, the connector 1 can optionally include at least one electrical I/O interface 52 mounted to the housing 18, connected between the circuit card 16 and the connector 1 by electrical connecting device(s), for achieving electrical connectivity with the mating connector. The interface 52 is not illustrated in FIGS. 3-5.

The I/O connector 1 may be mounted on a circuit card assembly that includes the circuit card 16 and various electrical components (not shown) mounted on the circuit card 16. The specific type and arrangement of the electrical components on a circuit card is well understood by persons of ordinary skill in the art, and is therefore not detailed herein. The circuit card 16 is electrically connected to the transceiver 8 by the electrical connecting device 14.

With reference to FIGS. 2-5, the I/O connector 1 is mounted on the circuit card 16. The connector housing 18 includes one or more mounting bays 20 for receiving one or more the active electro-optical inserts 50 therein. The mounting bay 20 is configured to allow floating movement of the insert 50 toward and away from the mating connector (i.e. toward and away from the circuit card 16). In another embodiment, the mounting bay 20 could allow float in all directions.

Figure 4:
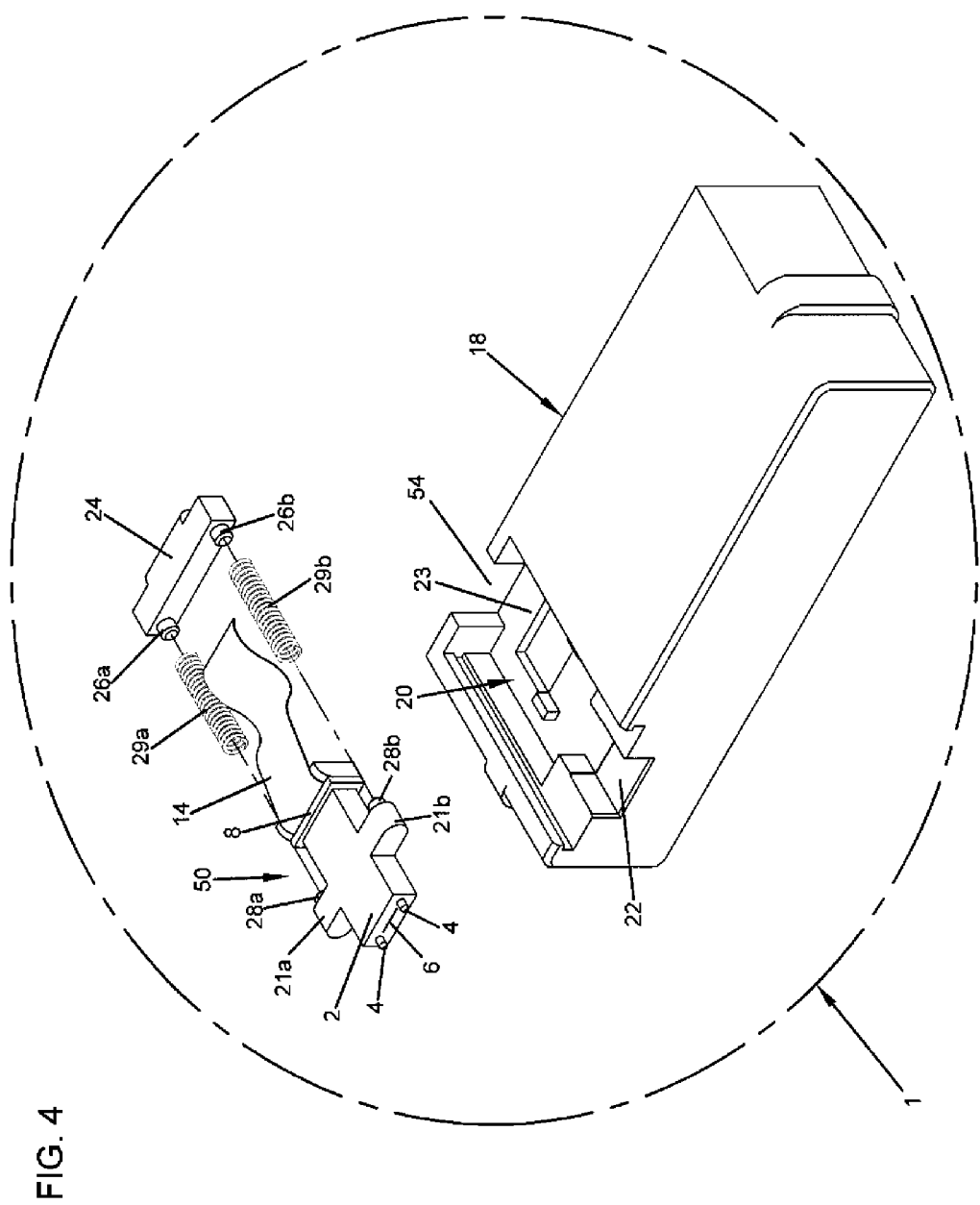
FIG. 4 illustrates the I/O connector disassembled into its components including a ferrule, optical communication component, and a connector housing.
Figure 5:
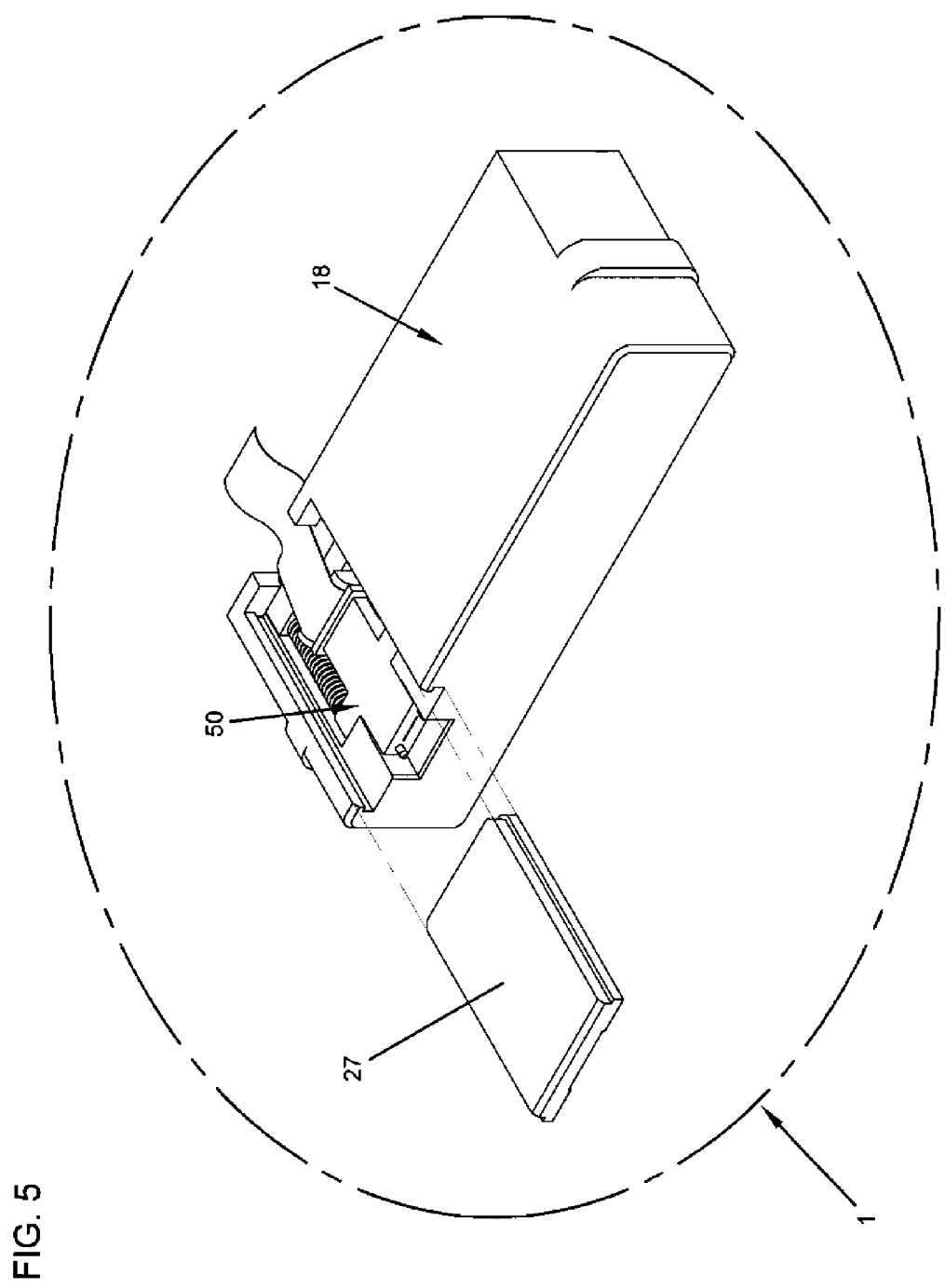
FIG. 5 illustrates the ferrule and the optical communication component installed in the connector housing with a lid for closing the connector housing.

In particular, with reference to FIGS. 2, 4 and 5, the ferrule body 3 is provided with a pair of wings 21a, 21b on either side thereof. The mounting bay 20 has a narrow region 22 at the front end thereof that receives the portion of the ferrule body 3 forward of the wings 21a, 21b, and a widened region 23 at the rear end thereof that receives the rest of the ferrule body 3 including the wings 21a, 21b. A fixed anchor 24 is disposed in the widened region 23 at the rear thereof. The anchor 24 includes a pair of nubs 26a, 26b at each end, and the wings 21a, 21b include corresponding nubs 28a, 28b. Biasing springs 29a, 29b extend between the wings 21a, 21b and the anchor 24 for biasing the ferrule body 3 and the anchor 24 away from one another. The nubs 26a, 26b, 28a, 28b maintain alignment of the biasing springs 29a, 29b. The electrical connecting device 14 extends through an opening 54 formed in the rear of the housing 18. A removable lid 27 can be provided to close the top of the mounting bay 20 to retain the insert 50 in place.

Thus, the insert 50 is allowed to float to accommodate blind mating to an opposing mating connector. Further, the spring loading of the insert 50 means the faces of the insert 50 and the mating connector will be pressed together to improve optical connectivity via the exposed ends 6. In addition, the spring loading on the insert 50 is applied away from the center of the ferrule body 3, which frees up space in the mounting bay 20 for placement of the electrical connecting device 14. The need for a fiber optic pigtail is eliminated, and the interconnect between the connector 1 and the circuit card 16 is entirely electrical, with the movements between the insert 50 and the circuit card 16 being accommodated by the electrical connecting device 14 which can more readily withstand such movements.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An I/O connector, comprising:
 a connector housing;
 an insert that is mounted to and removable as a unit from the connector housing, the insert including: a ferrule body having at least one optical fiber embedded therein, the at least one optical fiber having an exposed end configured to mate with at least one optical fiber end on a mating connector and a second end, and an optical communication component that is coupled to the at least one optical fiber via the second end;
 an electrical connecting device connected to the optical communication component; and
 the connector housing has a slot and the insert and at least a portion of the electrical connecting device are mounted within the slot for movement relative to the connector housing.

2. The I/O connector of claim 1, wherein the ferrule body has a first end and a second end, the exposed end of the at least one optical fiber being disposed at the first end and the optical communication component being mounted to the ferrule body at the second end.

3. The I/O connector of claim 1, wherein the optical communication component is an optical transceiver, an optical receiver, or an optical transmitter.

4. The I/O connector of claim 1, wherein the electrical connecting device is a flexible ribbon cable.

5. The I/O connector of claim 1, comprising a plurality of the optical fibers embedded within the ferrule body and coupled to the optical communication component.

6. The I/O connector of claim 1, further comprising at least one electrical I/O interface mounted to the connector housing.

7. The I/O connector of claim 1, wherein the ferrule body and the optical communication component are mounted to the connector housing to allow the ferrule body and the optical communication component to float for alignment to a mating connector.

8. The I/O connector of claim 7, comprising a bias mechanism engaged with the ferrule body to bias the ferrule body toward a mating connector.

9. The I/O connector of claim 1, wherein the connector is configured to complete a blind-mate interconnect.

10. A circuit card assembly, comprising:
a circuit card with electric components mounted thereon;
an I/O connector mounted to the circuit card, the I/O connector including:
 a connector housing having a mounting bay;
 a ferrule body mounted to the connector housing and having at least one optical fiber embedded therein, the at least one optical fiber having an exposed end configured to mate with at least one optical fiber end on a mating connector and a second end; and
 an optical communication component being coupled to the at least one optical fiber via the second end;
an electrical connecting device electrically connecting the optical communication component to the circuit card,
wherein the ferrule body, the optical communication component and at least a portion of the electrical connecting device are mounted within the mounting bay for movement relative to the connector housing as an integral unit.

11. The circuit card assembly of claim 10, wherein the ferrule body has a first end and a second end, the exposed end of the at least one optical fiber being disposed at the first end, and the optical communication component is mounted to the ferrule body at the second end to allow the ferrule body and the optical communication component to float as an integral unit for alignment to a mating connector.

12. The circuit card assembly of claim 11, comprising a bias mechanism engaged with the ferrule body to bias the ferrule body toward a mating connector.

13. The circuit card assembly of claim 10, wherein the optical communication component is an optical transceiver, an optical receiver or an optical transmitter.

14. The circuit card assembly of claim 10, wherein the electrical connecting device comprises a flexible ribbon cable.

15. The circuit card assembly of claim 10, comprising a plurality of the optical fibers embedded within the ferrule body and coupled to the optical communication component.

16. The circuit card assembly of claim 10, further comprising at least one electrical I/O interace connected to the connector housing.

17. The circuit card assembly of claim 10, wherein the connector is configured to complete a blind-mate interconnect.

18. The circuit card assembly of claim 10, wherein there is no optical connection between the optical communication component and the circuit card.

* * * * *